United States Patent [19]

Ruff et al.

[11] 4,100,668

[45] Jul. 18, 1978

[54] METHOD OF MAKING A RUNG ASSEMBLY FOR A LADDER

[75] Inventors: George Robert Ruff, Newberry; Danny O'Brian Derrick, Columbia, both of S.C.

[73] Assignee: Shakespeare Company, Columbia, S.C.

[21] Appl. No.: 705,163

[22] Filed: Jul. 14, 1976

Related U.S. Application Data

[62] Division of Ser. No. 591,957, Jun. 30, 1975, abandoned.

[51] Int. Cl.$^2$ .................... B21D 39/00; B23P 11/02

[52] U.S. Cl. .................... 29/523; 188/194; 285/382.5

[58] Field of Search .................... 29/523; 285/382.5; 188/194

[56] References Cited

U.S. PATENT DOCUMENTS

| | | | |
|---|---|---|---|
| 1,054,865 | 3/1913 | Patterson | 29/523 UX |
| 3,924,883 | 12/1975 | Frank | 29/523 UX |

FOREIGN PATENT DOCUMENTS

| | | | |
|---|---|---|---|
| 448,919 | 6/1936 | United Kingdom | 29/523 |
| 505,677 | 5/1939 | United Kingdom | 29/523 |

*Primary Examiner*—Charlie T. Moon
*Attorney, Agent, or Firm*—Kenyon & Kenyon, Reilly, Carr & Chapin

[57] ABSTRACT

The rung assembly is made of two piece construction and of metal while the siderail is made of a reinforced plastics material. The rung assembly includes a rung having a hollow end and a flanged fitting which is secured over the hollow end of the rung by swaging of the hollow end and fitting under a longitudinally applied compressive force. The compression force forms peripheral beads on the rung and fitting which interlock with each other. The rung assembly is secured to the siderail by any suitable fastening means such as rivets, bolts and the like which pass through the flange of the fitting and siderail.

2 Claims, 5 Drawing Figures

METHOD OF MAKING A RUNG ASSEMBLY FOR A LADDER

This is a division of application Ser. No. 591,957 filed June 30, 1975, now abandoned.

This invention relates to a method of making a rung assembly for a ladder.

Heretofore, various materials and techniques have been used for manufacturing ladders. For example, wooden materials have been used to construct ladders composed of rungs, siderails and various struts and fastening members for securing the rungs to the siderails. Metals have also been used in constructing such ladders. However, these ladders have had a number of disadvantages. For example, for a given strength requirement, the wooden ladders have generally been relatively heavy and cumbersome to use. In the case of the metallic ladders, although these ladders have been of reduced weight for a given strength requirement, such ladders are not generally acceptable to use around electrical equipment.

In order to provide ladders which can be used around electrical equipment and which are of lightweight construction, various composite ladders have been proposed. For example, in some cases, the ladder rungs have been made of metal while the ladder siderails have been made of reinforced plastics material. However, in order to obtain the securement of the rungs to the siderails, cumbersome techniques have been employed. For example, it has been known to use a three-part metallic rung assembly consisting of a rung, a sleeve and a rung plate which can be secured to a pair of reinforced plastics siderails. (The term "three-part assembly" means that three components are required at each end of a rung to adapt the rung for securement to a siderail.) In order to assemble the ladder, the sleeve is placed over the end of the rung and centered inside the rung plate. The sleeve ends are then compressed lengthwise to cause the sleeve metal to flow radially outward and inward to form a tight assembly of the three elements. The assembly is then riveted to each of the siderails of plastics material.

Another known technique for assembling a composite ladder resides in the use of a three-part rung assembly which consists of a rung and two washer-like annular elements. In order to assemble the ladder, two steps are required. In a first step, a first peripheral bead is formed on the rung a distance from the end of the rung. One of the annular elements is then placed on the beaded end of the rung and the rung is inserted through a preformed hole in a siderail of reinforced plastics construction. The second annular element is then placed on the portion of the rung projecting through the ladder siderail and then a second peripheral bead is formed on this rung projection in order to tightly secure the rung to the siderail.

However, these various techniques for constructing composite ladders generally require a relatively long time for assembling a ladder. Furthermore, in some cases, the rungs have been secured in such a manner that the rungs are able to rotate within the siderails upon the application of a torsional loading on the rung. In addition, in many cases, the rungs and siderails cannot be readily assembled in the field should such be required either for the construction of a ladder or for the replacement of broken runs.

In the case where a rung is swaged to a bracket which is, in turn, riveted to a siderail, use has been made of a C-shaped bracket. However, while this gives a relatively wide footprint, rigidity is sacrificed due to the bridge between the fitting ends.

In those cases where a rung is passed through a large hole in a siderail and held in place by plates or sleeves, not only has the rail been weakened but also when the ladder is carried on the exterior of a vehicle, the open rung ends produce an irritating whistle.

Accordingly, it is an object of this invention to provide an economical and efficient method of making a composite ladder.

It is another object of this invention to provide a simple method for attaching a metallic rung to a reinforced plastics siderail of a ladder.

It is another object of the invention to provide a ladder rung assembly of a minimal number of parts.

It is another object of the invention to provide a method which requires simple steps to form a rung assembly which can be readily attached to a siderail.

It is another object of the invention to provide a fitting to be supported over its entire footprint.

It is another object of the invention to provide a composite ladder with closed rung ends to prevent whistling.

It is another object of the invention to provide a rung assembly which is relatively rigid when secured in place on a siderail.

It is another object of the invention to provide a rung assembly which offers high resistance to torsional loading when mounted in place on a siderail.

Briefly, the invention provides a rung assembly of two-piece construction. The term "two-piece" means that two components are required at each end of a rung to adapt the rung for securement to a siderail. The rung assembly comprises a rung having at least one hollow end and a flanged fitting mounted on the hollow end of the rung in interlocking relation. To this end, at least a portion of each of the rung and the fitting are upset relative to each other to secure the fitting and rung together. In this respect, both the rung and the fitting have a bead which is interlocked with the bead of the other.

The rung may be of any suitable shape such as a cylindrical shape or a polygonal shape. In addition, the rung may be of hollow construction throughout or may be solid for a portion of its length while the ends are hollow.

The fitting has a collar which is disposed about the rung and in which the bead is formed as well as a flange which is directed outwardly of the rung to permit securement to the siderail.

The invention further provides a ladder which is formed by at least one siderail and at least one of the rung assemblies. The siderail is formed with a wall of substantially solid construction against which the end of the rung and the flange of the fitting of the rung assembly abut. Suitable fastening means, such as rivets, bolts, screws and the like, pass through the fitting flange as well as the wall of the siderail in order to secure the rung assembly to the siderail. To this end, the fitting flange and siderail wall may be provided with preformed holes to permit passage of the fastening means.

The siderails are preferably made of reinforced plastics material, such as glass fiber reinforced plastic, while the rung assembly is made entirely of metal. However, other combinations of materials may also be used. For example, the siderails may be made of aluminum.

The invention further provides a method of making a rung assembly which comprises the steps of supporting a rung having at least one hollow end throughout the inside and partially on the outside of this end, mounting a flanged fitting over the hollow end of the rung, and compressing the end of the rung longitudinally to swage the end and the fitting simultaneously to form interlocking peripheral beads on each. In carrying out this method, the inside of the rung is firmly supported by a tool which passes through the rung while the outside of the rung is supported by a second tool. This latter tool extends to a point short of the end of the rung and faces one end of the fitting which is disposed about the end of the rung. The inner tool carries a fixed flange or collar which abuts against one end of the rung and a movable collar which abuts the opposite end of the rung. In order to carry out the swaging operation, the movable collar on the one tool is moved toward the other end so that the two tools are moved relative to each other on the tube. This imparts a longitudinal compressive force on the hollow end of the rung as well as on the collar of the fitting about this end. Since the fitting and tube are unsupported to the outside, when the applied force becomes sufficient, each of the rung and fitting are upset to form the peripheral beads.

After manufacture, a rung assembly may be secured to a siderail by any suitable fastening means. For this purpose, the siderail may be made of any suitable cross-sectional shape which is adapted to receive the fitting of the rung assembly. For example, the siderail may be of channel-shaped cross-section or of T-shaped cross-section. In any case, the wall of the siderail which receives the rung assembly is solid except for the holes required for the passage of the fastening means. Thus, once a rung assembly is secured in place, any torsional loading on the rung is resisted by the interlocking relationship between the annular beads of the rung and fitting.

These and other objects and advantages of the invention will become more apparent from the following detailed description and appended claims taken in conjunction with the accompanying drawings in which:

Figure 1:
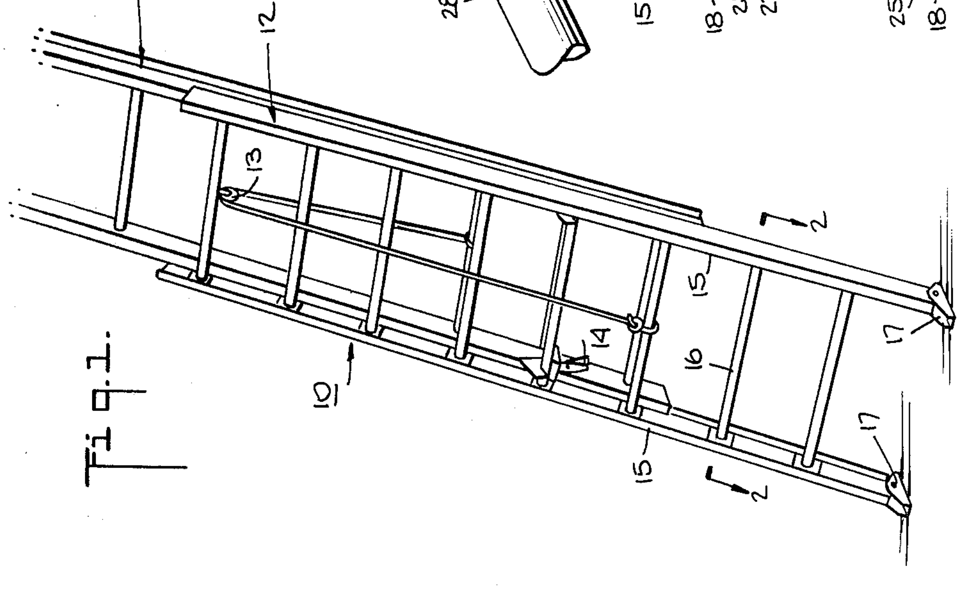
FIG. 1 illustrates a perspective view of a ladder made in accordance with the invention.

Referring to FIG. 1, the ladder 10 is constructed of two sections 11, 12 which are interconnected with respect to each other, as is known, by a suitable pulley and rope arrangement 13 and by suitable locking members 14. Each ladder section 11, 12 is formed of a pair of siderails 15 and a plurality of transverse rung assemblies 16. Suitable support feet 17 may also be secured on the ends of a respective ladder section 11, 12 as is known.

Figure 2:
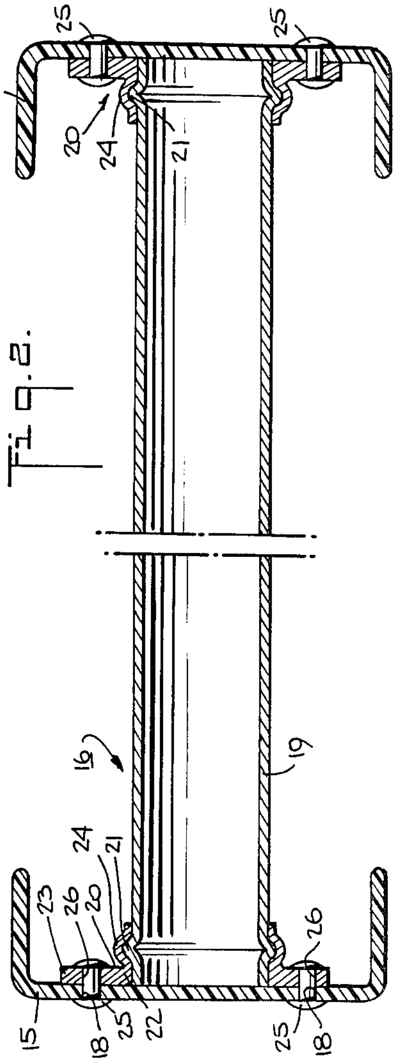
FIG. 2 illustrates a cross-sectional view taken on line II—II of FIG. 1.

Referring to FIG. 2, the siderails 15 are each of a channel-shaped cross-section (or other suitable section) and are each made of a reinforced plastics material such as a glass fiber reinforced plastics material. Each has a web or wall of substantially solid construction except for a plurality of apertures 18 which are provided for purposes explained below.

Each rung assembly 16 is made of metal and extends between the two siderails 15. Each rung assembly 16 includes an elongated cylindrical tubular rung 19 and a pair of flanged fittings 20. The rung 19 has an annular peripheral bead 21 formed adjacent each end. Each fitting 20 is formed of an annular collar 22 and a radially directed flange 23 and a bead 24 is formed on the collar 22. The beads 21, 24 are disposed in interlocking relation with each other and serve to secure the rung 19 to the respective fitting 20. As shown, the rung assembly 16 is secured to the siderails 15 by means of a suitable fastening means 25 such as rivets which pass through apertures 26 in the flange 23 of each fitting 20 and the apertures 18 in the web of the siderails 15. Both the end of the rung 19 and the flange 23 of a fitting 20 abut against the web of a siderail 15.

The rung 19 may be of any suitable cross-sectional shape such as cylindrical or polygonal. In a similar fashion, the collar 22 of each fitting 20 conforms to the outside shape of the rung 19. However, the flange 23 of each fitting may be of a different shape. For example, the flange 23 may be of a rectangular shape so as to more readily fit within the shape defined by the siderail 15. Also, the number of fastening means 25 used may be an even number, such as four.

Figure 3:
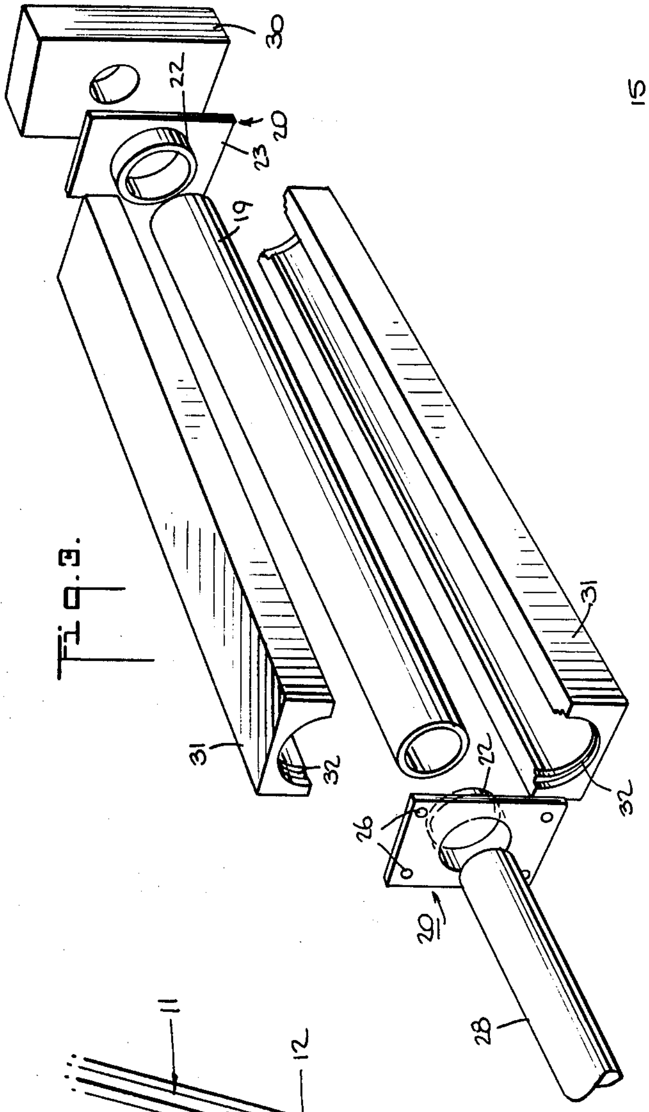
FIG. 3 illustrates an exploded view of an assembly for forming a rung assembly according to the invention.
Figure 4:
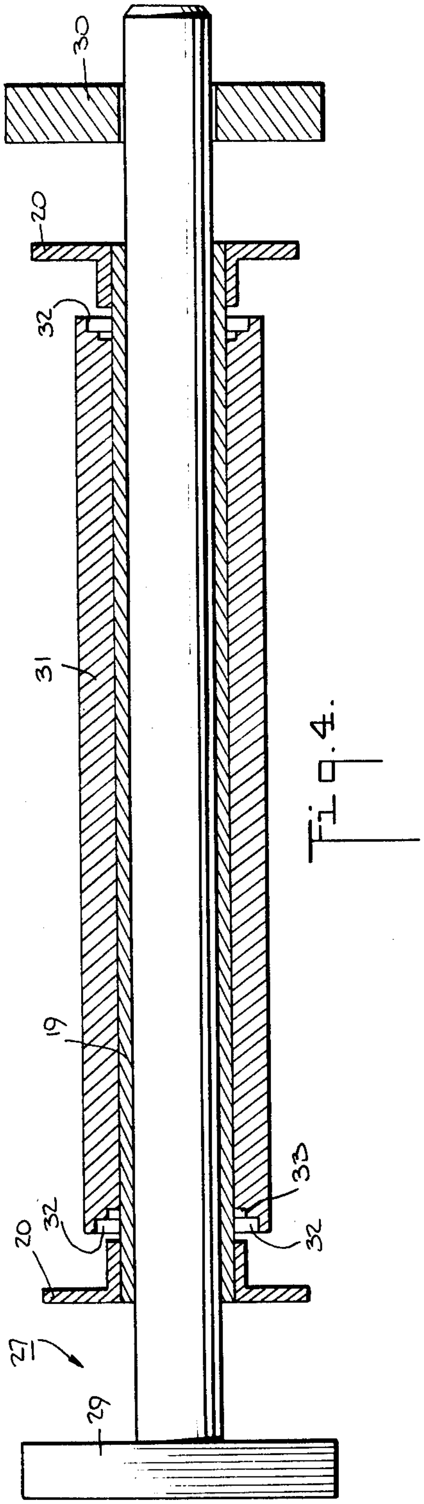
FIG. 4 illustrates a partial cross-sectional view of the assembly of FIG. 3 prior to a swaging operation.
Figure 5:
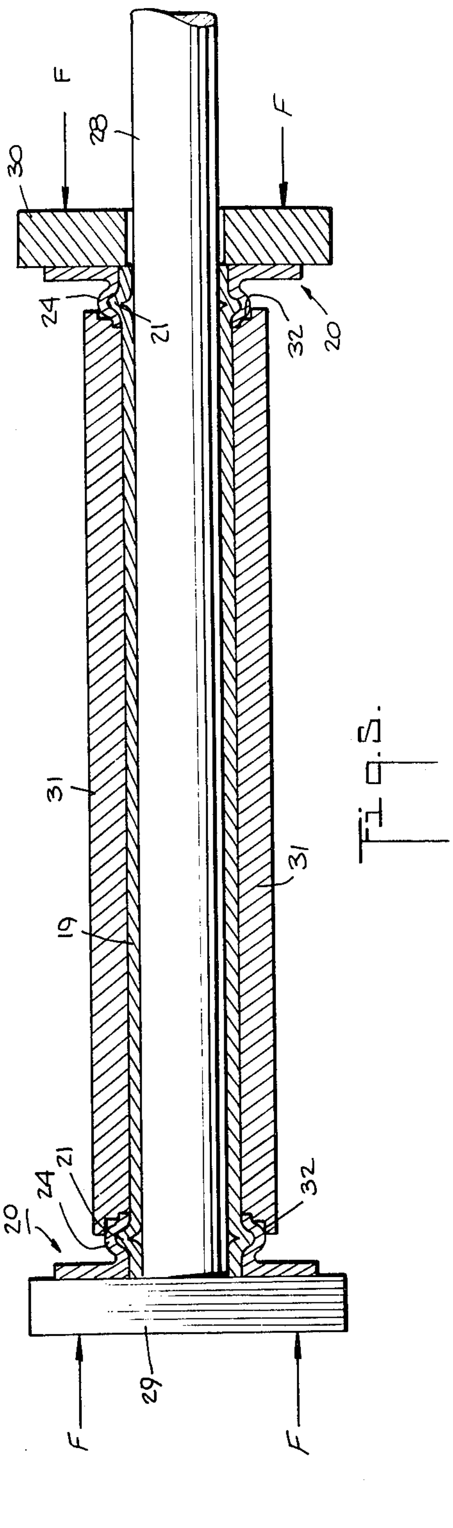
FIG. 5 illustrates a view similar to FIG. 4 during a swaging operation.

Referring to FIGS. 3 to 5, in order to form a rung assembly, a hollow rung member 19 is first placed over a tool 27 which has an elongated rod-like section 28, a flange 29 fixed at one end of the rod-like section 28 and a movable collar 30 mounted on the opposite end of the rod-like section 28. Flange 29 may alternatively be formed to move independently of the rod-like section 28 and may be a movable collar as is collar 30. In addition, a second tool 31 is disposed about the outside of the rung 19 to support the rung 19 from the outside. To this end, the tool 31 is a two-piece mold-like member wherein the two pieces can be firmly secured about the rung member 19 and subsequently separated in any known manner. The tool 31 may also be a one-piece tool if only one fitting 20 is secured to the tube 19. This would allow removal of the tube 19 from the tool 31 from one end only. The dimensions of the tools 27, 31 and the rung 19 are such that the rung 19 is firmly supported throughout the inside while being firmly supported partially on the outside. As shown in FIG. 4, the outer tool 31 leaves the two ends of the rung 19 unsupported to the outside.

With the fittings 20 mounted on the ends of the tube 19 (FIG. 4) in facing relation to the tool 31 suitable forces F are applied against the collar 30 and the flange 29 to move the collar 30 and the tool 31 relative to the rod-like section 28 and flange 29 of the tool 27. This causes a compressive force to be applied longitudinally on the unsupported ends of the rung 19. When the compressive force becomes sufficient the ends of the rung 19 deform to form annular peripheral beads 21 while the collar 22 of the fittings 20 simultaneously deform to form peripheral beads 24 (FIG. 5). These beads, 21, 24 are thus located in the unsupported outside of the rung 19 and collar 22 adjacent the ends of the rung 19.

As shown in FIG. 4, the tool 31 is provided with a counterbore 32 with a retaining groove 33 at each end 30. Each groove 33 receives the collar 22 of a fitting 20 when the fitting 20 abuts against the end of the tool 31 during compression of the rung ends. The counterbore 32 facilitates the deformation of the collar 22 of the fittings 20 into the annular beads 24 by allowing clearance for the beads 24 to be formed and yet allow the flanges 23 to remain flat during the swaging operation.

After the rung 19 and fittings 20 have been swaged together, the collar 30 is moved away from the tool 31, the two piece tool 31 is opened and the rung assembly 16 removed from the tool 27. The completed rung assembly 16 may then be secured to a siderail 15 (FIG. 2) by passing the rivets 25 through the apertures 26 in the fittings 20.

The force required to swage the tube 19 and fittings 20 together is a function of tube diameter, tube and fitting thickness, tube and fitting hardness and the like.

The invention thus provides a ladder of composite materials wherein the siderails may be formed of a plastics material suitable for use with electrical equipment and with metallic rungs. Since the number of components used to assemble the ladder are at a minimum, the overall time and cost for constructing the ladder is at a relative minimum.

The invention further provides a rung construction which is capable of resisting high torsion loadings due to the integrated nature of the swaging of the rung to the fittings via the annular beads. For example, the rung can withstand approximately 100 foot-pounds of torsional force before turning within the fittings. In any event, the rungs are such as to meet and exceed the requirements of ANSI A 14.5 - 1974 Par. 6.2.5 Type I.

The invention further provides a method which utilizes few machine operations in order to produce a rung assembly.

In accordance with the invention, any size rung, siderail, and the like that meets strength requirements and weight and size requirements may be constructed.

The requirements of size apply to shape and the type of material used. The only limitation being the ability of the material to meet required forming operations and practicality of use for this purpose. For example, in one case, for a rung member of 1¼ inch O.D., a channel-shaped siderail was 3¼ inches in overwall width with 1 3/16 inch flanges.

The type of connection described may also be used on a metal ladder where the ladder rail itself is extruded to form collars at the point of rung attachment. Thus, a rung can be swaged directly to the ladder rail.

What is claimed is:

1. A method of making a rung assembly for a ladder comprising supporting a rung having a pair of hollow ends throughout the inside of each said end and partially on the outside of each said end;

mounting a flanged fitting having an annular collar and a radially directed flange over each said end of said rung; and compressing said ends of said rung longitudinally to swage each respective rung end and said annular collar of a fitting simultaneously to form outwardly directed interlocking peripheral beads thereon located in the unsupported outside of said rung and collar adjacent said ends of said rung.

2. A method as set forth in claim 1 wherein a two-piece mold-like tool is disposed on the outside of said rung to support said rung on the outside, said tool being disposed in abutting relation to an end of said collar of each said fitting during said step of compressing said rung ends.

* * * * *